(12) United States Patent
Yellin

(10) Patent No.: US 6,618,433 B1
(45) Date of Patent: Sep. 9, 2003

(54) FAMILY OF LINEAR MULTI-USER DETECTORS (MUDS)

(75) Inventor: Daniel Yellin, Ra'anana (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/633,131

(22) Filed: Aug. 4, 2000

(51) Int. Cl.[7] ............................................. H04B 1/707
(52) U.S. Cl. ...................................... 375/148; 375/144
(58) Field of Search ................................. 375/140, 142, 375/144, 147, 148, 150; 370/320, 335, 342

(56) References Cited

U.S. PATENT DOCUMENTS

| | | | |
|---|---|---|---|
| 6,034,986 A | | 3/2000 | Yellin .......................... 375/148 |
| 6,058,138 A | * | 5/2000 | Fukumasa et al. .......... 375/130 |
| 6,118,806 A | * | 9/2000 | Niida et al. .................. 375/148 |
| 6,125,137 A | * | 9/2000 | Wang et al. ................. 375/148 |
| 6,208,683 B1 | * | 3/2001 | Mizuguchi et al. .......... 375/140 |
| 6,208,684 B1 | * | 3/2001 | Yellin et al. ................. 375/144 |
| 6,215,814 B1 | * | 4/2001 | Ylitalo et al. ................ 375/148 |
| 6,249,251 B1 | * | 6/2001 | Chang et al. ................ 342/378 |
| 6,301,293 B1 | * | 10/2001 | Huang et al. ................ 375/130 |

FOREIGN PATENT DOCUMENTS

| WO | WO 00/18030 | 3/2000 |
|---|---|---|

OTHER PUBLICATIONS

A. J. Viterbi, "CDMA Principals of Spread Spectrum Communication", Addison–Wesley Publishing Company, 1995.
S. Verdu, "Multi-user Detection", Cambridge University Press, 1998.
J.G. Proakis, "Digital Communications", Third Edition McGraw Hill Series in Electrical and Computer Engineering, 1995.

* cited by examiner

*Primary Examiner*—Young T. Tse
(74) *Attorney, Agent, or Firm*—Eitan, Pearl, Latzer & Cohen Zedek, LLP.

(57) ABSTRACT

A multi-user detector of transmitted signals includes a bank of despreaders and a processor. Each despread signal (produced by the despreaders) has cyclic and channel variations. The bank of despreaders despreads the transmitted signals to produce despreaded signals and the processor receives the despreaded signals and separately processes the cyclic and the channel variations. The processor includes a cyclic variation processor and a channel variation processor. The cyclic variation processor generally processes the cyclic variation of the transmitted signals and the channel variation processor communicates with the cyclic variation processor and processes at least the channel variation of the transmitted signals. The cyclic variation processor includes a weighting operator which weights the transmitted signals with at least one tap weight and a tap weight generator which generates the at least one tap weight at least from a cyclic code.

26 Claims, 3 Drawing Sheets

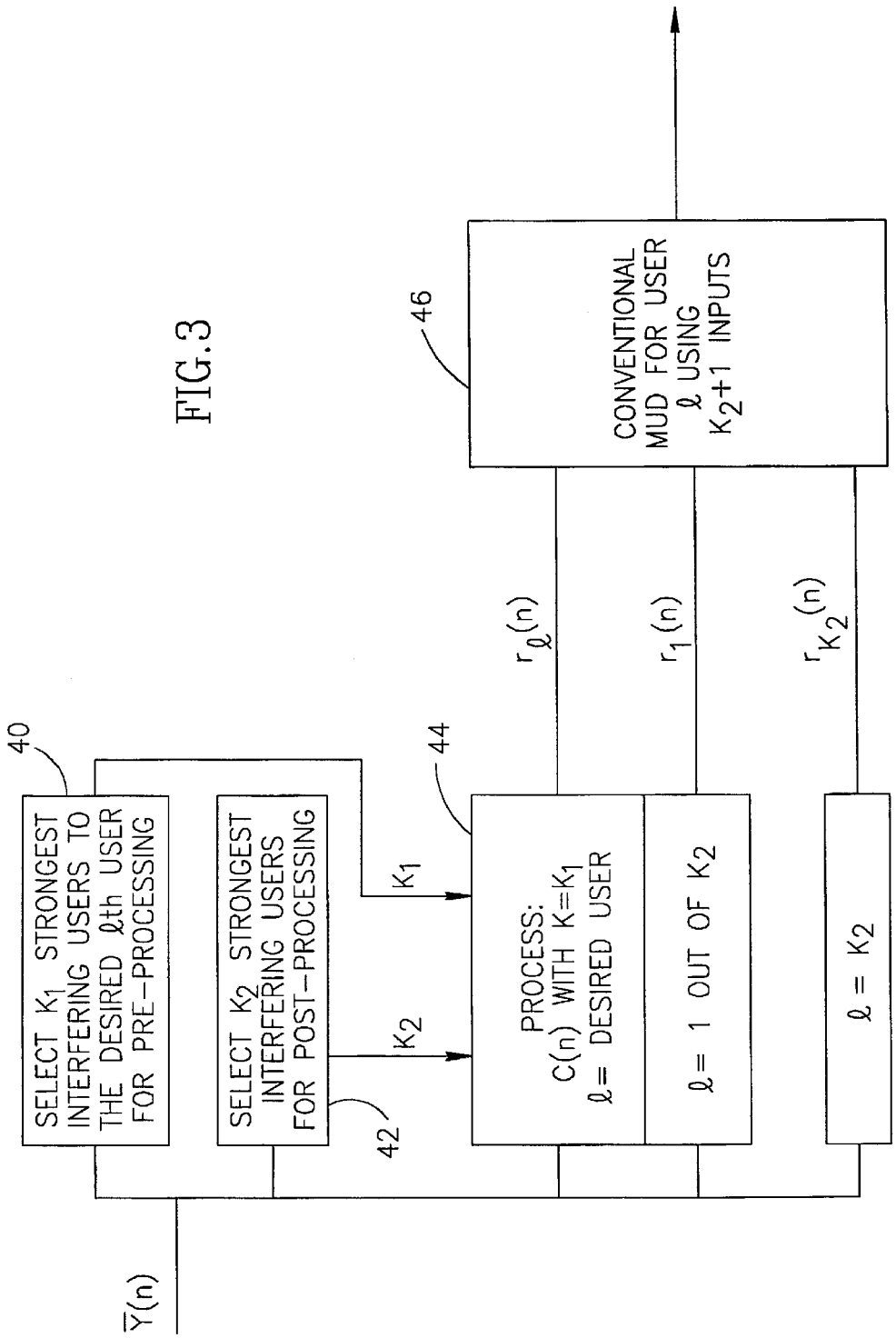

FAMILY OF LINEAR MULTI-USER DETECTORS (MUDS)

BACKGROUND OF THE PRESENT INVENTION

In code division, multiple access (CDMA) cellular telephony, a mobile telephone communicates with a base station where each user and each base station has its own "spreading code" used for modulation of the transmitted signal and for separating the different signals corresponding to different users/subscribers. Typically, a receiver picks up many echoes (multipath reflections) of a transmitted signal, each having different and randomly varying delays and amplitudes. In such a scenario, the spreading codes that were originally designed to be orthogonal among the different users are no longer orthogonal and the users are no longer separated. Consequently, a mobile unit, when attempting to detect only a single user, regards all other channel users (including signals from other base stations) as creators of interference. One exemplary single-user multipath detector is a rake receiver that combines the different channel paths into a single replica of the transmitted signal.

The rake receiver detects the signal of interest while treating the interference from other users as background noise. A multiple-user detection (MUD) scheme, on the other hand, incorporates various levels of a-priori information on the interference and may significantly outperform the rake receiver (or any other single-user receiver). The maximal level of a-priori information occurs when the interfering signal is completely known to the receiver, as is the case in U.S. Pat. No. 6,034,986. In the past two decades, numerous methods for multi-user detection were developed based on different levels of utilization of a-priori information and leading to different levels of receiver complexity.

Unfortunately, multi-user detection schemes are significantly more complex than single-user ones. Not only does multi-user detection require (either explicitly or implicitly) processing the received signal with a bank of despreaders (with each despreader being matched to a distinct user), the outputs of this despreader bank must further be processed according to some a priori criterion, such as the maximum likelihood criterion, whose complexity is exponential in the number of users.

Exponential complexity is intolerable unless the number of users is extremely small, which is not the case in cellular communications. Therefore, suboptimal, linear MUD schemes were developed, among them are the decorrelator and/or the minimum mean squared error (MMSE) receiver. Still, linear MUDs require that a signature cross-correlation matrix, or a rescaled version of which, be inverted with each new symbol/block that arrives. This is computationally too heavy to be performed by the mobile unit. Numerous methods for approximating matrix inversion were suggested recently, such as Verdu's first order approximation (O(K) operations per symbol per user).

Another weakness of existing MUD schemes for long code DS-CDMA (where the spreading code spans more than one symbol) is that there is no simple approach to turn them into the more desirable form of adaptive algorithms, since a symbol rate adaptive algorithm cannot track the symbol rate variations of the cross-correlation matrix. In fact, the problem of adaptive algorithms for long code DS-CDMA is regarded an open problem in the scientific literature.

U.S. Patent Publication WO 00/18030, assigned to the common assignee of the present invention, recognizes that the spreading codes are cyclic and describes a method of processing received signals by dividing the cyclic spreading codes into a plurality of sections. Each section is assigned a different cost function and a respective set of receiver parameters that are used to minimize the associated cost function. Portions of the received signal which were spread by the same section of code are jointly processed, so as to dynamically update the associated set of receiver parameters.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 3 is a schematic illustration of a two-step MUD using the present invention and a conventional MUD.

Figure 1:
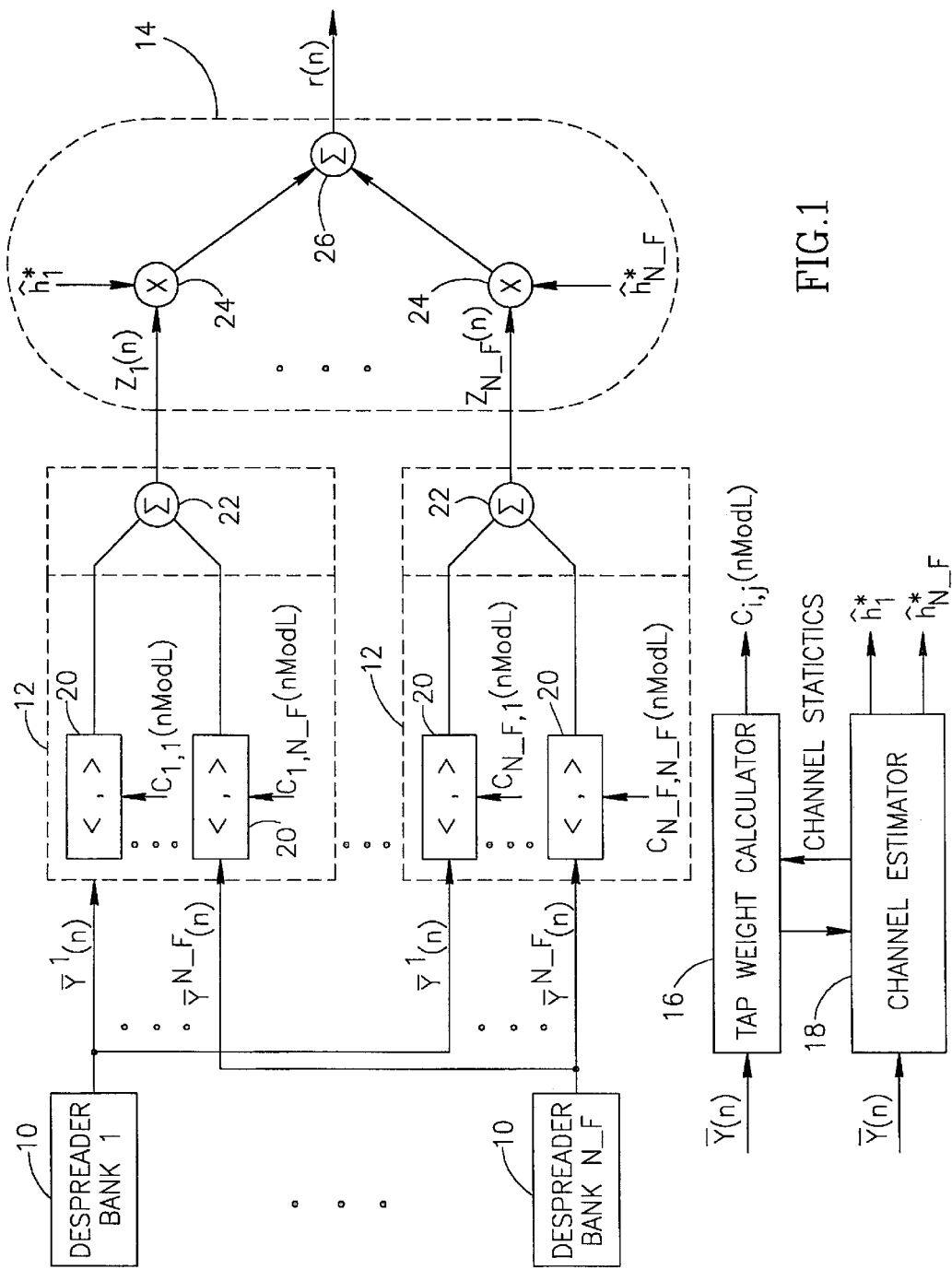
FIG. 1 is a schematic illustration of an embodiment of a multi-user detector (MUD) in accordance with a first embodiment the present invention.

It will be appreciated that, for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF PREFERRED EMBODIMENTS

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Some portions of the detailed description which follow are presented in terms of algorithms and symbolic representations of operations on data bits or binary digital signals within a computer memory. These algorithmic descriptions and representations may be the techniques used by those skilled in the data processing arts to convey the substance of their work to others skilled in the art.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. This apparatus may be specially constructed for the desired purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), electrically programmable read-only memories (EPROMs), electrically erasable and programmable read only memories (EEPROMs), magnetic or optical cards, or any other type of media suitable for storing electronic instructions, and capable of being coupled to a computer system bus.

A conventional spread spectrum signal may be viewed as the result of mixing a narrowband information-bearing signal s[n] with an informationless wideband "spreading" signal PN[n], where the spreading signal is a pseudo-noise (PN) sequence. The receiver synchronizes the incoming signal to a locally generated version $PN_0[n]$ of PN[n] and mixes the received signal with the locally generated PN sequence $PN_0[n]$, thereby removing the original PN sequence PN[n] from the signal and "collapsing" the signal to the information-bearing signal s[n].

The spreading signal PN[n] is typically a coding sequence of some kind, such as a pseudo-random code. For example, the IS-95 standard for cellular communication employs the product of a 64 chip Walsh code (aimed at separating up to 64 different users per base) and a periodic PN sequence (aimed at separating the different bases) which is typically a "long code" of 512*64 chips (or 512 symbols). The spreading signal for each user is its Walsh code combined with the current 64 chips of the PN sequence of its base station. The PN code is finite and thus, is used cyclically.

The present invention comprises a family of linear, multiuser detectors that jointly process portions of the received signals which were spread by the same section of the cyclic spreading code, or by adjacent sections of code (e.g. for the codes which spread neighboring symbols n−1, n, n+1). As described in detail hereinbelow, the receiver structure of the present invention decouples the processing of the cyclic variation (from the PN sequence) from the channel variation (due to the transmission of the signal). Thus, for example, the present invention generally avoids the need for real-time matrix inversions due to channel and PN variations, such as is required with the conventional approach.

With the proposed approach, the PN dependent term holding the users' signature cross-correlation matrix is generally independent of the instantaneous channel conditions (it does depend on long time averaging properties of the channel), and therefore, the relevant matrix inversions may be calculated a-priori (or off-line). The present invention also comprises a family of adaptive MUD algorithms for long code DS-CDMA.

Reference is now made to FIG. 1, which illustrates a first embodiment of the detector of the present invention, operative on N_F fingers. It is noted that fingers j represent different transmission paths for the same signal and thus, are delayed from each other.

The detector of FIG. 1 comprises N_F despreader banks 10, N_F cyclic variation processors 12, one per finger, a single channel variation processor 14, a tap weight generator 16 and a channel estimator 18.

Both types of processors 12 and 14 have a rake-type shape in that each input signal to the processor, one per finger, is multiplied in some fashion with a calculated value associated with that finger and the resultant signals are summed together.

The jth despreader bank 10 operates to despread the digitized antenna signals, after downconversion and filtering, producing the despreader output vector $\overline{Y}^j(n)$ for the jth finger. In general, $\overline{Y}^j(n)$ is a vector of K elements, the l-th one of which corresponds to the despreaded version of the user of interest and the other K−1 are despreaded versions of some other users. These K−1 additional users are despreaded and are used in processing the signal of the l-th user in order to improve the detection of the transmitted signal of the desired user. Each despreader within the bank 10 has the spreading code associated with the ith user ($1 \leq i \leq K$) and produces that user's estimated signal for each symbol n.

Each cyclic variation processor 12 comprises a plurality of vector multipliers 20 and a first level summer 22 while channel variation processor 14 comprises a plurality of scalar multipliers 24 and a second level summer 26. It is noted that vector multipliers 20 produce the inner product $$<\overline{x}, \overline{y}> \equiv \sum_i \overline{x}_i \cdot \overline{y}_i$$

between the vectors $\overline{X}$ and $\overline{Y}$.

In each cyclic variation processor 12, each vector multiplier 20 produces the inner product between the despreader output vector $\overline{Y}^j(n)$ of the jth finger and a per-processor, per-finger tap weight vector $C_{i,j}(n \bmod L)$ where the tap weights are cyclical and the cycle is of length L, the length of the PN sequence in symbols. The tap weights are produced by tap weight generator 16 from a despreader output vector $\overline{Y}(n)$ as discussed in more detail hereinbelow. First level summer 22 sums the output of the vector multipliers 20, to produce the signal $z_i(n)$ for the ith finger. Mathematically, this is given by:

$$z_i(n) = \sum_{j=1}^{N\_F} \overline{C}_{i,j}(n \bmod L)^+ \cdot \overline{Y}^j(n) \qquad \text{Equation 1}$$

where $^+$ denotes the conjugate transpose operator The channel variation processor 14 operates as follows: The ith multiplier 24 multiplies the ith signal $z_i(n)$ with the ith channel tap estimate $\hat{h}_i$ (from channel estimator 18). Second level summer 26 sums the outputs of the multipliers 24, thereby to produce the user output signal r(n). Mathematically, this is given by:

$$r(n) \equiv \sum_{i=1}^{N\_F} \hat{h}_i^+ \cdot z_i(n) \qquad \text{Equation 2}$$

It will be appreciated that the tap weights $\overline{C}_{i,j}(n \bmod L)$ are generated to emphasize the l-th user from among the multiplicity of users such that user output signal r(n) has minimal noise and cross-talk from the other K−1 users. To do so, tap weight generator 16 attempts to optimize some performance criterion defined with respect to user output r(n), as discussed in more detail hereinbelow.

The issue of how to choose those other K−1 users will not be addressed, since it is known in the art, except to note that one generally chooses those users that are strongly interfering with the desired user. It is further noted that channel estimator 18 is a conventional channel estimator and therefore, it will not be discussed in more detail except to note that it provides the estimated channel coefficients to tap weight generator 16.

The signal r(n) is then passed on for further processing to a symbol detector (not shown) or to a de-interleaver and then to a decoder (neither shown) in the case of coded communications, as is known in the art.

It should also be noted that Equation 2 corresponds to what is known as a maximal ratio combining, but other combining criteria may be utilized, e.g. a selection criterion that sets r(n) to be equal to the element in the sum of Equation 2 whose amplitude is maximal. The computational complexity is significantly reduced in this case, since only one cyclic variation processor 12 needs to be active.

Note also that the conventional rake receiver is obtained as a special case of the above, in which all elements of the $\overline{C}_{i,i}(n\bmod L)$s are set to zero except the l-th element of $\overline{C}_{i,i}(n\bmod L)$, for all $1 \leq i \leq N\_F$, which is set to unity. The value of l is the desired user number. In this case, the output of the other K−1 users is completely ignored.

As opposed to conventional practice which often uses the multi-user rake outputs as the MUD input, the present invention operates directly on the despreader outputs. From the despreader outputs one may generate the bank of rake receiver outputs. However, the set of despreader outputs is much more redundant (by a factor of $N\_F^2$) than the bank of rake outputs. This would imply that the present invention requires a larger dimensionality than the conventional approach. Nevertheless, as discussed hereinbelow, there are advantages to this more redundant approach.

Figure 2:
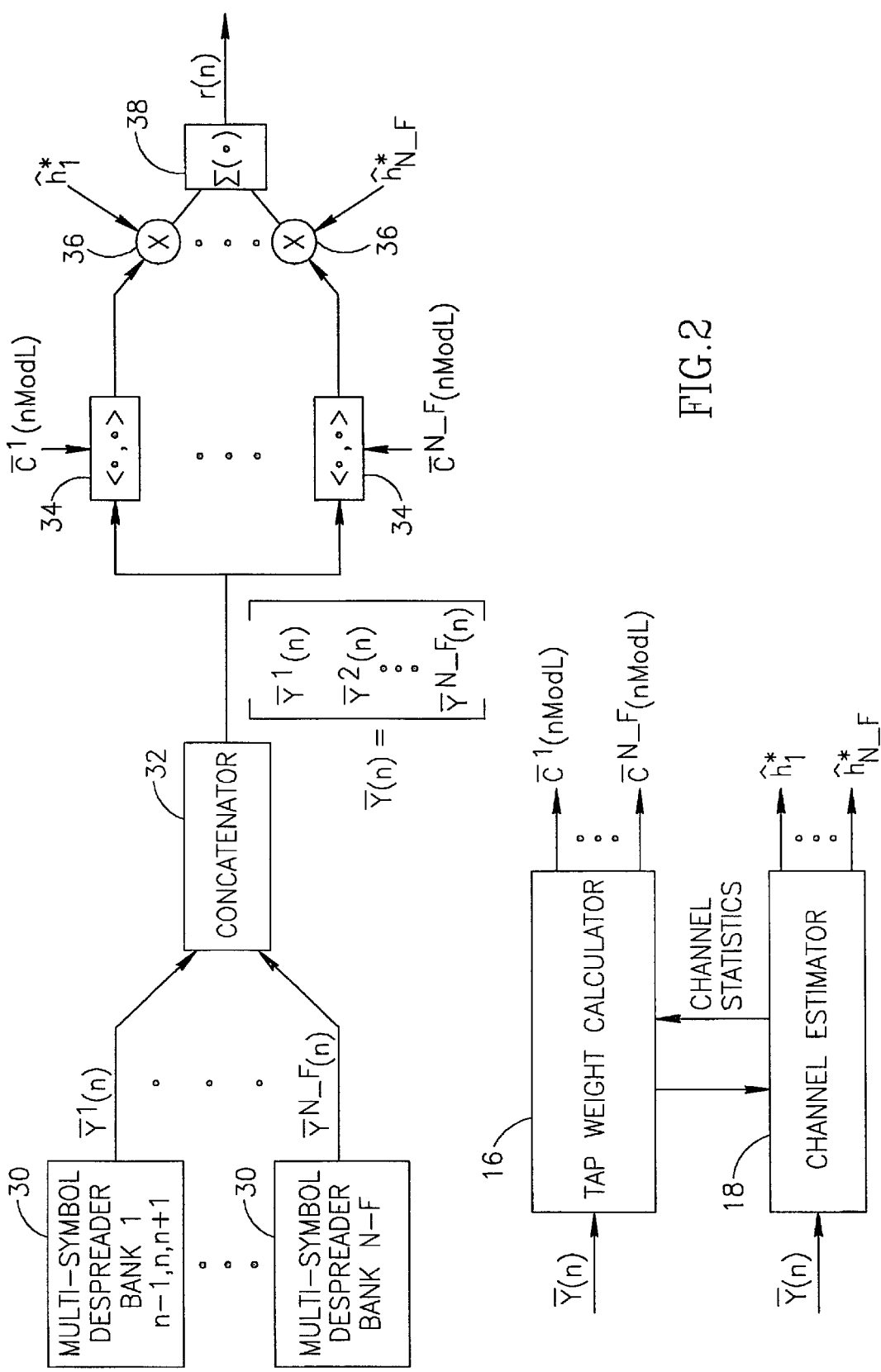
FIG. 2 is a schematic illustration of an embodiment of a MUD in accordance with a second, multi-symbol embodiment the present invention.

The present invention also incorporates a multiple-symbol MUD detector, shown in FIG. 2 to which reference is now made. This detector comprises N_F, multi-symbol despreader banks 30, a concatenator 32, N_F vector multipliers 34, one per finger, N_F multipliers 36, a summer 38, tap weight generator 16 and channel estimator 18.

As before, each despreader bank 30 operates to despread the digitized antenna signals, after downconversion and filtering, for one finger. However, in this embodiment, each despreader bank 30 produces multiple symbols at a time, around a center symbol n. The jth despreader output is now, $$\overline{Y}^j(n) = \begin{bmatrix} \overline{Y}^j(n+D) \\ \overline{Y}^j(n+D-1) \\ \vdots \\ \overline{Y}^j(n+1) \\ \overline{Y}^j(n) \\ \overline{Y}^j(n-1) \\ \vdots \\ \overline{Y}^j(n-D+1) \\ \overline{Y}^j(n-D) \end{bmatrix} \quad \text{Equation 3}$$

where D is a design parameter. For example, D may be set to 1. For the purpose of simplifying notation, the concatenated vector of all despreader bank output is still denoted by $\overline{Y}(n)$ as with the previous case.

Concatenator 32 concatenates the outputs of multi-symbol despreader banks 30 to produce the despreader output vector $\overline{Y}(n)$ which is provided as input to each vector multiplier 34. The latter produce the inner product of the despreader output vector and a per-finger tap weight vector $\overline{C}_i(n\bmod L)$. The relevant multiplier 36 multiplies the output of each vector multiplier 34 by its associated channel estimate $\hat{h}_i$ and summer 38 combines the results into the user signal r(n). As in the previous embodiment, the tap weights $\overline{C}_i(n\bmod L)$ are generated to emphasize one user from among the multiplicity of users such that user output signal r(n) has minimal noise and cross-talk from the other users.

It is further noted that $\overline{C}_i(n\bmod L)$ is a concatenation of the tap weights of the previous embodiment as follows:

$$\overline{C}_i(n\bmod L) = [\overline{C}_{i,0}(n\bmod L)^T, \overline{C}_{i,1}(n\bmod L)^T, \ldots, \overline{C}_{i,N\_F-1}(n\bmod L)^T]^T \quad \text{Equation 4}$$

The output signal r(n) is given by:

$$r(n) \equiv \sum_{i=0}^{N\_F-1} \overline{C}^i(n\bmod L)^+ \cdot (\hat{h}_i^+ \cdot \overline{Y}(n)) \quad \text{Equation 5}$$

$$= \left( \sum_{i=0}^{N\_F-1} \overline{C}^i(n\bmod L)^+ \cdot \hat{h}_i^+ \right) \cdot \overline{Y}(n)$$

The next section of the present application discusses a number of different tap weight generators 16. The following section discusses a number of different uses of the present invention. The claims follow Appendix A which details how to generate one element used in the following discussion.

The Tap Weight Generator
The MMSE Tap Weight Generator

With the above MUD front-end, we now consider the well known minimum mean square error (MMSE) performance criterion. Let, $$e(n) \equiv s_l(n) \cdot \sum_{j=0}^{N\_F-1} |\hat{h}_j|^2 - r(n) \quad \text{Equation 6}$$

$$= s_l(n) \cdot \sum_{j=0}^{N\_F-1} |\hat{h}_j|^2 - \sum_{j=0}^{N\_F-1} \overline{C}_j(n\bmod L)^+ \cdot \hat{h}_j^+ \cdot \overline{Y}(n)$$

where $s_l(n)$ is the transmitted signal of the user of interest and the term $\Sigma|\hat{h}_j|^2$ is used only for the purpose of gain normalization. Then, the MMSE criterion is aimed at minimizing:

$$MSE = E\{|e(n)|^2 \quad \text{Equation 7}$$

where $E\{\cdot$ stands for the expectation operator taken with respect to the transmitted symbols, the channel noise, and the channel taps. Note that conventional practice is to take the channel taps as deterministic and known quantities, and thus exclude them from the expectation operation. The present invention, on the other hand, includes the channel taps, hence the MMSE solution may be interpreted as the one that minimizes the mean square error (MSE) over the ensemble of channels.

Substituting Equation 6 into Equation 7, and differentiating with respect to the $\overline{C}_i(n)$'s, the following set of normal equations for the proposed receiver front-end are obtained:

$$E\{\overline{Y}(n) \cdot \hat{h}_i \cdot e(n)^+\} = 0 \quad i = 0, 1, \ldots, NF-1 \quad \text{Equation 8}$$

Re-substitution of Equation 6, yields $$\sum_{j=0}^{N\_F-1} E\{\overline{Y}(n) \cdot \hat{h}_i^+ \cdot \hat{h}_j \cdot \overline{Y}(n)^+\} \cdot \overline{C}_j(n \text{Mod} L) = \quad \text{Equation 9}$$

$$E\left\{\overline{Y}(n) \cdot \hat{h}_i^+ \cdot \sum_{j=0}^{N\_F-1} |\hat{h}_j|^2 \cdot s_l(n)^+\right\} \quad i = 0, 1, \ldots, N\_F-1$$

The above set of normal equations depend on the joint probability distribution of the channel taps (and their estimators). The following assumptions may be made:

Assumption 1:

Perfect channel knowledge, i.e.

$$\hat{h}_i = h_i \forall i \quad \text{Equation 10}$$

and the following very mild assumptions on the joint distribution of the channel taps Assumption 2:

$$E\{h_i\} = 0 \forall i \quad \text{Equation 11}$$

Assumption 3:

$$E\{|h_i|^2\}, E\{|h_i|^4\} < \infty \forall i \quad \text{Equation 12}$$

Assumption 4:

$$E\{h_i^a \cdot (h_i^+)^b \cdot h_j^c \cdot (h_j^+)^d\} = E\{h_i^a \cdot (h_i^+)^b\} \cdot E\{h_j^c \cdot (h_j^+)^d\} \quad \forall i \neq j,$$
$$0 \leq a,b,c,d < 4 \quad \text{Equation 13}$$

Assumption 5:

$$E\{|h_i|^2 \cdot h_i^+\} = 0 \quad \forall i \quad \text{Equation 14}$$

It is noted that the above assumptions may be satisfied for many commonly used multi-path channel models, e.g. the conventional practice in cellular channels which is Rayleigh fading with independent multipath components. However, one may derive the MMSE solution with any given (and finite) joint moments of the channel taps generally up to the fourth order. In practice, one may use the channel estimator to measure these moments and solve accordingly without introducing any a-priori assumptions regarding the joint probability distribution of the channel taps. It should also be noted that simulation results revealed a low sensitivity of the overall performance to the above set of assumptions.

After carrying out the necessary expectation operations, Equation 9 may be written as:

$$\overline{C}^{MMSE}(n\text{Mod}L) = \begin{bmatrix} \overline{C}_0^{MMSE}(n\text{Mod}L) \\ \cdots \\ \overline{C}_{N-F-1}^{MMSE}(n\text{Mod}L) \end{bmatrix}_{(N\_F^2 \cdot N\_K) \times I} \quad \text{Equation 15}$$

$$= A_{MMSE}(n\text{Mod}L)^{-1} \cdot \overline{b}_{MMSE}$$

where, for the single symbol model of FIG. 1, N__K=K and for the multi-symbol model of FIG. 2, N__K=3K or larger if more symbols are used at once (i.e. D>1). For 2 fingers (i.e. N_F=2), the matrix, $A_{MMSE}$(n Mod L), is given by:

$$A_{MMSE}(n\text{Mod}L) \equiv \begin{vmatrix} \begin{bmatrix} k_1 \cdot I & \vdots & \overline{0} \\ \overline{0} & \vdots & I \end{bmatrix} + \begin{bmatrix} \eta_2^{-1} & \vdots & \overline{0} \\ \overline{0} & \vdots & \eta_2^{-1} \end{bmatrix} \times (M(n\text{Mod}L)^+)^{-1} \vdots \begin{bmatrix} \overline{0} & \vdots & I \\ \overline{0} & \vdots & \overline{0} \end{bmatrix} \\ \cdots \\ \begin{bmatrix} \overline{0} & \vdots & \overline{0} \\ I & \vdots & \overline{0} \end{bmatrix} \vdots \begin{bmatrix} I & \vdots & \overline{0} \\ \overline{0} & \vdots & k_2 \cdot I \end{bmatrix} + \begin{bmatrix} \eta_1^{-1} & \vdots & \overline{0} \\ \overline{0} & \vdots & \eta_1^{-1} \end{bmatrix} \times (M(n\text{Mod}L)^+)^{-1} \end{vmatrix} \times$$

$$\begin{bmatrix} M(n\text{Mod}L)^+ & \vdots & \overline{0} \\ \overline{0} & \vdots & M(n\text{Mod}L)^+ \end{bmatrix}$$

Equation 16 where $\overline{0}$ is a matrix of N__K×N__K zeros and $$k_i \equiv \frac{E\{|h_i|^4\}}{E\{|h_1|^2\} \cdot E\{|h_2|^2\}} \quad \text{Equation 17}$$

$$\eta_i \equiv \frac{E\{|h_i|^2\} \cdot N^2}{E\{\overline{w}(n \cdot N)^+ \cdot \overline{w}(n \cdot N)\}} \cdot G^+ \cdot G \quad \text{Equation 18}$$

where, the vector w(n.N) denotes N consecutive channel noise samples that are assumed to be i.i.d. (independent and identically distributed), N is the processing gain (or the relationship of chips to symbols) and G is a square diagonal matrix of the gains of individual users and $G^+ \cdot G$ is proportional to the users' power levels. It will be appreciated that $\eta_i$ is a square diagonal matrix holding the signal to noise ratios (SNRs) of the various users for the i-th finger. If the noise samples are not i.i.d. and/or the noise statistics and/or the user's gain are unknown to the receiver, the SNR matrices $\eta_1$ and $\eta_2$ can be estimated using conventional techniques and then plugged into Equation 16.

The matrix M(n Mod L) is the cross-talk matrix (of the PNs) relating the transmitted symbols of the various users to the different despreader outputs. It is defined in Appendix A for both the single and multi-symbol embodiments, but in both cases it is independent of the channel taps or their statistics.

For the single symbol model of FIG. 1, with N_F=2, the 4K×1 vector $\overline{b}_{MMSE}$ is the vector whose l-th element (related to the user of interest) is $+k_1$ and whose 2K+K+l-th element is $+k_2$. All other elements of $\overline{b}_{MMSE}$ are zero.

For the multi-symbol model of FIG. 2, the 12K×1 vector $\overline{b}_{MMSE}$ is the vector whose K+l-th element is $1+k_1$ and whose 9·K+K+l is $1+k_2$. All other elements of $\overline{b}_{MMSE}$ are zero. In this embodiment, the matrix G should be concatenated three times to generate a 3K×3K SNR matrix for the "virtual" 3K users (or more if more than three symbols are used at once, i.e. D>1).

It will be appreciated that the MMSE solution of the present invention (represented by Equation 16) is independent of the actual channel estimates $\hat{h}_1$. Instead, the tap weights $\overline{C}^{MMSE}(\text{nmodL})$ depend on joint moments of the channel estimates (i.e. the statistics of the channel). In many cases, the channel is time-varying but its statistics are stationary. Since the matrix $A_{MMSE}$ (n Mod L) depends only on the stationary statistics of the channel, its inversion may be performed once, off-line.

Thus, the tap weights $\overline{C}^{MMSE}(\text{nmodL})$, which are a function of the matrix $A_{MMSE}(\text{n Mod L})$, may be computed once, typically off-line, for each of the L phases of the PN sequence. The tap weights $\overline{C}^{MMSE}(\text{nmodL})$ may be subsequently used during operation.

It will be appreciated that, since the matrix inversion of Equation 15 and Equation 16 occurs once and thus, the L values of $\overline{C}^{MMSE}(\text{nmodL})$ are fixed, the present invention may be implemented on a mobile unit.

The Decorrelator Tap Weight Generator

A decorrelator solution separates the users by removing the cross-correlations between their signatures. Typically, the MMSE solution converges to a decorrelator solution in the situation of high SNR ratios (i.e. where there is little additive noise and the dominant interfering term is the cross-talk between the users). The decorrelator solution of the present invention may be found by letting the noise variance approach zero in Equation 16. In this situation, the SNR matrix $\eta_i$ converges to infinity and thus, the matrix in Equation 16 converges to:

$$A(n\text{Mod}L) \equiv \begin{bmatrix} \begin{bmatrix} k_1 \cdot I & \vdots & \overline{0} \\ \overline{0} & \vdots & I \end{bmatrix} \vdots \begin{bmatrix} \overline{0} & \vdots & I \\ \overline{0} & \vdots & \overline{0} \end{bmatrix} \\ \cdots \\ \begin{bmatrix} \overline{0} & \vdots & \overline{0} \\ I & \vdots & \overline{0} \end{bmatrix} \vdots \begin{bmatrix} I & \vdots & \overline{0} \\ \overline{0} & \vdots & k_2 \cdot I \end{bmatrix} \end{bmatrix} \times \begin{bmatrix} M(n\text{Mod}L)^+ & \vdots & \overline{0} \\ \cdots \\ \overline{0} & \vdots & M(n\text{Mod}L)^+ \end{bmatrix} \quad \text{Equation 19}$$

Substituting Equation 19 into Equation 15 produces the decorrelator solution, where, for simplicity we present the solution for N_F=2:

$$\overline{C}^{DEC}(n\text{Mod}L) = \begin{bmatrix} \overline{C}_1^{DEC}(n\text{Mod}L) \\ \overline{C}_2^{DEC}(n\text{Mod}L) \end{bmatrix}_{(4 \cdot N\_K) \times I} \quad \text{Equation 20}$$

$$= \begin{bmatrix} M(n\text{Mod}L)^+ & \vdots & \overline{0} \\ \overline{0} & \vdots & M(n\text{Mod}L)^+ \end{bmatrix} \times \begin{bmatrix} \overline{e}_l \\ \overline{e}_{K+l+1} \end{bmatrix}$$

where $\overline{e}_i$ is the $(2 \cdot N\_K) \times 1$ normal basis vector whose i-th element is 1, and all other elements are zero. As before, l is set to the desired user number.

It will be appreciated that the solution in Equation 20 is generally independent of the channel estimates (and of their statistics). It only depends on the cross-talk matrix M(n Mod L). Thus, as with the MMSE case, the decorrelator solution may be computed once, for all channel conditions.

Approximate MMSE Tap Weight Generators

Through the matrix G, the SNR matrix $\eta_i$ is a function of the power levels assigned by the base station to each of the mobile user's. Since these power levels may be changed from time to time, the MMSE tap weights should be recomputed whenever the transmission power of any of the users is modified. The following high SNR approximation to the MMSE solution may be utilized to avoid the matrix inversion operation.

Equation 16 may be rewritten in the following form:

$$A_{MMSE}(n\text{Mod}L) \equiv [\alpha + \beta(n\text{Mod}L)^{-1}] \times \begin{bmatrix} M(n\text{Mod}L)^+ & \vdots & \overline{0} \\ \overline{0} & \vdots & M(n\text{Mod}L)^+ \end{bmatrix} \quad \text{Equation 21}$$

where $$\alpha \equiv \begin{bmatrix} \begin{bmatrix} k_1 \cdot I & \vdots & \overline{0} \\ \overline{0} & \vdots & I \end{bmatrix} \vdots \begin{bmatrix} \overline{0} & \vdots & I \\ \overline{0} & \vdots & \overline{0} \end{bmatrix} \\ \cdots \\ \begin{bmatrix} \overline{0} & \vdots & \overline{0} \\ I & \vdots & \overline{0} \end{bmatrix} \vdots \begin{bmatrix} I & \vdots & \overline{0} \\ \overline{0} & \vdots & k_2 \cdot I \end{bmatrix} \end{bmatrix} \quad \text{Equation 22}$$

and $$\beta(n\text{Mod}L) \equiv \begin{bmatrix} M(n\text{Mod}L)^+ \times \begin{bmatrix} \eta_2 & \vdots & \overline{0} \\ \overline{0} & \vdots & \eta_2 \end{bmatrix} \vdots \begin{bmatrix} \overline{0} & \vdots & \overline{0} \\ \overline{0} & \vdots & \overline{0} \end{bmatrix} \\ \cdots \\ \begin{bmatrix} \overline{0} & \vdots & \overline{0} \\ \overline{0} & \vdots & \overline{0} \end{bmatrix} \vdots M(n\text{Mod}L)^+ \times \begin{bmatrix} \eta_1 & \vdots & \overline{0} \\ \overline{0} & \vdots & \eta_1 \end{bmatrix} \end{bmatrix} \quad \text{Equation 23}$$

Now, applying a simple high SNR first order approximation, the following is obtained:

$$[\alpha + \beta(n \text{ Mod } L)^{-1}]^{-1} \approx \alpha^{-1} \beta(n \text{ Mod } L)^{-1} \times \alpha^{-2} \quad \text{Equation 24}$$

Substituting this into Equation 15, the following high-SNR approximation for the MMSE solution is obtained:

$$\overline{C}^{MMSE}(n\text{Mod}L) \approx \begin{bmatrix} M(n\text{Mod}L)^+ & \vdots & \overline{0} \\ \overline{0} & \vdots & M(n\text{Mod}L)^+ \end{bmatrix}^{-1} \times \quad \text{Equation 25}$$

$$\alpha^{-1} \times \overline{b}^{MMSE} -$$

$$\begin{bmatrix} M(n\text{Mod}L)^+ & \vdots & \overline{0} \\ \overline{0} & \vdots & M(n\text{Mod}L)^+ \end{bmatrix}^{-1} \times$$

$$\beta(n\text{Mod}L)^{-1} \times \alpha^{-2} \times \overline{b}^{MMSE}$$

$$\equiv \overline{C}^{DEC}(n\text{Mod}L) -$$

$$\begin{bmatrix} M(n\text{Mod}L)^+ & \vdots & \overline{0} \\ \overline{0} & \vdots & M(n\text{Mod}L)^+ \end{bmatrix}^{-1} \times$$

$$\beta(n\text{Mod}L)^{-1} \times \alpha^{-2} \times \overline{b}^{MMSE}$$

$$\approx \overline{C}^{DEC}(n\text{Mod}L) - \eta^{-1} \times \overline{\Delta}(n\text{Mod}L)$$

where, in the transition to the last line of Equation 25, the simple approximation $M(n)^{-1} \approx I$ is utilized and where:

$$\eta \equiv \begin{bmatrix} \begin{bmatrix} \eta_2 & : & \bar{0} \\ \bar{0} & : & \eta_2 \end{bmatrix} & \vdots & \begin{bmatrix} \bar{0} & : & \bar{0} \\ \bar{0} & : & \bar{0} \end{bmatrix} \\ & \cdots & \\ \begin{bmatrix} \bar{0} & : & \bar{0} \\ \bar{0} & : & \bar{0} \end{bmatrix} & \vdots & \begin{bmatrix} \eta_1 & : & \bar{0} \\ \bar{0} & : & \eta_1 \end{bmatrix} \end{bmatrix} \quad \text{Equation 26}$$

and $$\bar{\Delta}(n\text{Mod}L) \equiv \begin{bmatrix} M(n\text{Mod}L)^+ & : & \bar{0} \\ \bar{0} & : & M(n\text{Mod}L)^+ \end{bmatrix}^{-1} \times \alpha^{-2} \times \bar{b}^{MMSE} \quad \text{Equation 27}$$

It will be appreciated that this approximate MMSE solution is relatively simple to implement. The vectors of the decorrelator MUD as well as $\bar{\Delta}$(n Mod L) are computed once. From that point on, generally all variations of the power and channel noise variance of the users are taken into account via the SNR matrix $\eta$. No extra computational effort (i.e. MIPS) is required aside from that necessary to perform the updates $\bar{C}^{DEC}$(n Mod L)$-\eta^{-1} \times \bar{\Delta}$(n Mod L), which are simple due to the fact that $\eta$ is diagonal.

It is noted that, from Equation 25, it also follows that:

$$\bar{C}^{MMSE}(n\text{Mod}L) \approx \bar{C}^{DEC}(n\text{Mod}L) - \begin{bmatrix} M(n\text{Mod}L)^+ & : & \bar{0} \\ \bar{0} & : & M(n\text{Mod}L)^+ \end{bmatrix} \eta^{-1} \times \bar{\Delta}(n\text{Mod}L) \quad \text{Equation 28}$$

which is another approximate solution which can be utilized when the user's power is varying.

Adaptive Tap Weight Generators

The previous embodiments require off-line matrix inversions. The following adaptive tap weight generators do not require matrix inversions and they typically converge to the solution within finite time. Typically, adaptive solutions such as these require initializing the tap weight vectors $\bar{C}^{adaptive}$(nmodL) at some simple value, such as all zeros except for the l-th element of $C_{i,i}$.

A least mean squares (LMS) algorithm for minimizing the MSE criterion of Equation 7 is given by iterating over the normal equations in Equation 8. The resulting algorithm is, $$\bar{C}_i(t) = \bar{C}_i(t-1) + \mu \cdot \bar{Y}(n) \cdot e(n;t-1)^+ \cdot \hat{h}_i^+ \; 0 \leq i \leq N\_F-1 \quad \text{Equation 29}$$

where $\mu$ is the step size parameter, t is a cyclic time index given by:

$$t = (n \text{ Modulo } L)t - 1 = ((n-L)\text{Modulo } L) \quad \text{Equation 30}$$

and the error term e(n;t−1) is given by:

$$e(n; t-1) \equiv s_l(n) \cdot \sum_{j=0}^{N\_F-1} |\hat{h}_j|^2 - r(n; t-1) = \quad \text{Equation 31}$$

-continued $$s_l(n) \cdot \sum_{j=0}^{N\_F-1} |\hat{h}_j|^2 - \sum_{j=0}^{N\_F-1} \bar{C}_j(t-1)^+ \cdot \hat{h}_j^+ \cdot \bar{Y}(n)$$

It will be appreciated that the present invention incorporates other adaptive algorithms, e.g. the normalized LMS (NLMS) or the recursive least squares (RLS) and its variants, which may be derived similarly.

For the front-end of in FIG. 1, Equation 29 reduces to:

$$\bar{C}_{i,j}(t) = \bar{C}_{i,j}(t-1) + \mu \cdot \bar{Y}_j(n) \cdot e(n;t-1)^+ \cdot \hat{h}_i^+ \; 0 \leq i,j \leq N\_F-1 \quad \text{Equation 32}$$

where e(n;t−1) is derived by substituting Equation 1 and Equation 2 for r(n) in Equation 31.

A drawback of the above algorithms is that the memory size for storing the tap weight vectors is:

$$L \cdot \text{Dim}\{\bar{C}_{i,j}\} \cdot N\_F^2 \quad \text{Equation 33}$$

In order to reduce this memory requirement (but at the expense of performance), one can replace $\bar{C}_{i,i}(t)$ by the basis vector $\bar{e}_l$. The resulting algorithm is still given by Equation 32 except that, in this embodiment, only the terms with i≠j are taken. The MUD output is in this case given by:

$$r(n; t-1) \equiv \sum_{i=1}^{N\_F} \hat{h}_i^+ \left[ \bar{e}_l^+ \cdot \bar{Y}^i(n) + \sum_{j=1, j\neq i}^{N\_F} \bar{C}_{i,j}(t-1)^+ \cdot \bar{Y}^j(n) \right] \quad \text{Equation 34}$$

and the error term e(n;t−1) of Equation 32 is calculated accordingly. One can also replace $\bar{C}_{i,i}(t)$ by $\bar{e}_l \cdot g_{i,i}(n)$ with the scalar $g_{i,i}(n)$ adapted similarly and acting as an automatic gain control (AGC) per finger.

Cyclic and Non-Cyclic Approaches

A further embodiment, which attempts to reduce the memory requirements, involves initially calculating generally fixed cyclic vectors and, during operation, modifying them with non-cyclic weights $\bar{d}_{i,j}(n)$. For the structure of FIG. 1, each $\bar{C}_{i,j}(t)$ is replaced by:

$$\bar{D}_{i,j}(t,n) \equiv \equiv \text{Diag}\{R_{j,i}(t)^{(l)}\} \cdot \bar{d}_{i,j}(n) \quad \text{Equation 35}$$

where $R_{j,i}(t)^{(l)}$ is the l-th row of the cross correlation matrix $R_{j,i}(t)$. Thus, $R_{j,i}(t)^{(l)}$ is the cross-talk term from finger j to finger i of the desired (l-th) user. In this embodiment, the cyclic time t=n Mod L is used for the cross-correlation matrix R, but the conventional symbol timing (i.e. non-cyclic) is used for the vector of adaptive weights $\bar{d}_{i,j}(n)$. It will be appreciated that there is a single vector $\bar{d}_{i,j}(n)$ for all L phases. Thus, in terms of storage, we completely eliminate the multiplication by L in Equation 33.

The vector of adaptive weights $\bar{d}_{i,j}(n)$ is generated by:

$$\bar{d}_{i,j}(n) = \bar{d}_{i,j}(n-1) + \mu \cdot \text{Diag}\{R_{j,i}(t)^{(l)}\} \cdot \bar{Y}(n) \cdot e(n;t)^+ \cdot \hat{h}_i^+ \; 0 \leq i,j \leq NF-1 \quad \text{Equation 36}$$

It will be appreciated that a non-cyclic adaptation is performed; thus the recursion is over the time index n rather than the cyclic time index t.

The MUD output is given by:

$$r(n; t) \equiv \sum_{i=1}^{N\_F} \hat{h}_i^+ \left[ \overline{D}_{i,i}(t, n-1)^+ \cdot \overline{Y}^i(n) + \sum_{j=1, j\neq i}^{N\_F} \overline{D}_{i,j}(t, n-1)^+ \cdot \overline{Y}^j(n) \right]$$

$$= \sum_{i=1}^{N\_F} \hat{h}_i^+ \left[ d_{i,i}(n-1)^+ \cdot \overline{Y}^i(n) + \sum_{j=1, j\neq i}^{N\_F} d_{i,j}(n-1)^+ \cdot Diag\{R_{j,i}(t)^l\}^+ \cdot \overline{Y}^j(n) \right]$$

Equation 37 and the error term of Equation 36 is obtained as described hereinabove but using matrix D for vector C. Note that in the transition to the third line of Equation 37, the fact that $R_{i,i}(t)$ is the identity matrix is used.

As in previous embodiments, $\overline{d}_{i,i}(n)$ may be replaced with $\overline{e}_l$ at the expense of performance degradation. The resulting MUD algorithm output is still given by Equation 36 except that the adaptation is used only for $i \neq j$. The MUD output is given by, $$r(n; t) \equiv \sum_{i=1}^{N\_F} \hat{h}_i^+ \left[ \overline{e}_l^+ \cdot \overline{Y}^i(n) + \sum_{j=1, j\neq i}^{N\_F} \overline{D}_{i,j}(t, n-1)^+ \cdot \overline{Y}^j(n) \right]$$

$$= \sum_{i=1}^{N\_F} \hat{h}_i^+ \left[ \overline{e}_l^+ \overline{Y}^i(n) + \sum_{j=1, j\neq i}^{N\_F} d_{i,j}(n-1)^+ Diag\{R_{j,i}(t)^{(l)}\}^+ \overline{Y}^j(n) \right]$$

Equation 38

It will be appreciated that the present invention may also be developed using other types of least squares calculations, such as recursive least squares (RLS) and normalized least mean squares.

Cyclic and Non-Cyclic Approaches

It can be shown that, when the weights $\overline{d}_{i,j}(n)$ are allowed to be cyclic and with the choice of:

$\overline{d}_{i,i}(t) = \overline{C}_{i,i}(t)$ and $\overline{d}_{i,j}(t) = \text{Diag}\{R_{j,i}(t)^{(l)}\}^{-1} \cdot \overline{C}_{i,j}(t)$ the outputs of the MUD algorithms of Equation 32 and Equation 36 are generally similar. Thus, both may converge to the same MMSE solution. Given this, the two approaches may be combined, where the non-cyclic approach uses less memory while the cyclic approach provides better performance. The combination of the two approaches, allows cost/performance tradeoffs.

The Many Uses of the Present Invention

As discussed previously, since the present invention does not continually invert matrices (it either does so intermittently off-line or it adaptively generates the inverted matrix), the present invention may be implemented as a multi-user detector in a computationally-restricted mobile unit.

The present invention may also be utilized in base stations which jointly demodulates multiple users. In such a setting, some of the calculations are common to all users. For example, in the MMSE solution of Equation 15, the inverse of the matrix $A^{MMSE}$ is needed for all the users. The separate solution for each user is only a function of the vector $\overline{b}_{MMSE}$ which has the non-zero elements in the l-th position and l changes for each user. Thus, an MMSE, multiple user solution would share the main computational burden of inverting the matrix $A^{MMSE}$.

Even when only one user is desired, it may still be beneficial to utilize the present invention to demodulate multiple users. Once demodulated, these cleaner versions of the multiple users could be further processed in order to generate an even cleaner version of the desired user by e.g. a non-linear conventional maximum likelihood MUD or by a conventional MMSE MUD that requires symbol by symbol matrix inversions. But these matrices would be of lower dimensionality.

This latter embodiment is shown in FIG. 3 to which reference is now made. The despread signal $\overline{Y}(n)$ is provided to two interference processors 40 and 42 which determine the strongest interfering users to the desired user, user l. The first interference processor 40 determines a pre-processing value $K_1$ typically by selecting those users with the highest power levels. The second interference processor 42 determines a post-processing value $K_2$, for example, by calculating the MSE for the l-th user and selecting the $K_2$ users which are the strongest contributors to the MSE. The MSE is calculated by resubstitution of the MSE solution of Equation 15 into Equation 6 and then substituting the result into Equation 7.

The despread signal $\overline{Y}(n)$ is also provided to the receiver of the present invention (either of FIG. 1 or FIG. 2 and here labeled 44) which produces multiple "cleaner" signals, one of the desired user e and one of each of the $K_2$ users. For each processing, the $K_1$ users are sources of cross-talk. The $K_2+1$ "cleaner" signals are then provided to a conventional MUD 46 for the desired user l.

In another embodiment, a conventional MMSE receiver processes a small number of strong interfering users after the present invention processes all of the signals.

Finally, the present invention may be utilized even when there are multiple antennas. In this latter embodiment, the multiple fingers correspond to multipath components of the different antennas, but the present invention simply operates on this larger amount of fingers. It is noted that the antenna array may be used to null out signals that arrive from base stations that are not handled by the mobile unit or base station which operates the MUD of the present invention. This way, for example, one can use the MUD of the present invention to reduce the interference from other users at the same cell, but use the antenna array to reduce the interference from other cells.

While certain features of the invention have been illustrated and described herein, many modifications, substitutions, changes, and equivalents will now occur to those skilled in the art. It is, therefore, to be understood that the appended claims, found after the Appendix, are intended to cover all such modifications and changes as fall within the true spirit of the invention.

Appendix A: The Cross-Talk Matrix

The cross-talk matrix (for the single symbol implementation) is defined as:

$$M(n\text{Mod}L) \equiv \begin{bmatrix} I & \vdots & R_{1,0}(n\text{Mod}L) \\ R_{0,1}(n\text{Mod}L) & \vdots & I \end{bmatrix}_{2K \times 2K} \quad \text{Equation 39}$$

where $I$ is the $K$ times $K$ identity matrix and $R_{k,i}$ is a cross-correlation matrix defined as:

$$R_{k,i}(n) \equiv \qquad\qquad\qquad\qquad\qquad \text{Equation 40}$$

$$\sum_{j=-J}^{J} [Rp(\Delta_{k,i} + j, n) + Rn(\Delta_{k,i} + j, n)] \cdot \rho(j \cdot OS - \Omega_{k,i})$$

where $J$ is a predetermined value.

The variable $\rho(t)$ is the combined transmission and reception filter response sampled at $OS$ times the chip rate:

$$\rho(t) \equiv \int_{-\infty}^{\infty} h_{Tx}(t \cdot T_c/OS - \tau) \cdot h_{Rx}(\tau) \cdot d\tau \quad \text{Equation 41}$$

where $h_{Tx}$ and $h_{Rx}$ are the transmission and reception filter responses, respectively and $T_c$ is the chip period. In practice, $\rho(t)$ decreases rapidly to zero and hence a finite number of elements $J$ can be used in $$R_{k,i}(n) \equiv \sum_{j=-J}^{J} [Rp(\Delta_{k,i} + j, n) + Rn(\Delta_{k,i} + j, n)] \cdot \rho(j \cdot OS - \Omega_{k,i})$$

Equation 40.

It should be noted that $\Delta_{k,i} \equiv \lfloor (d_k - d_i)/OS \rfloor$ and $d_k$ is the delay (in samples) associated with the k-th multipath component, i.e. $\Delta_{k,i}$ is the delay difference between the k-th and i-th fingers in multiples of chips. $\Omega_{k,i}$ is the fractional delay between these fingers and is thus given by, $d_k - d_i - \Delta_{k,i} \cdot OS$. Without loss of generality, the following is assumed:

$$0 = d_0 < d_1 < \ldots < d_k d_k < N |\Delta_{k,i}| < N \quad \text{Equation 42}$$

The cross correlation matrices are given by:

$$Rp(d, n) \equiv \frac{1}{N} P(n \cdot N)^+ \cdot (I(N) - I(d)) \cdot P(n \cdot N - d) \quad \text{Equation 43}$$

$$Rn(d, n) \equiv \frac{1}{N} P(n \cdot N)^+ \cdot I(d) \cdot P(n \cdot N - d) \quad \text{Equation 44}$$

for $d > 0$. For $d \leq 0$, the cross correlation matrices are given by:

$$Rp(d, n) \equiv \frac{1}{N} P(n \cdot N)^+ \cdot I(N - |d|) \cdot P(n \cdot N + |d|) \quad \text{Equation 45}$$

$$Rn(d, n) \equiv \frac{1}{N} P(n \cdot N)^+ \cdot (I(N) - I(N - |d|)) \cdot P(n \cdot N + |d|) \quad \text{Equation 46}$$

where:

$$\overline{p}_i(n \cdot N) = \begin{bmatrix} PN_i(n \cdot N) \\ PN_i(n \cdot N + 1) \\ PN_i(n \cdot N + 2) \\ \vdots \\ PN_i(n \cdot N + N - 1) \end{bmatrix} \quad \text{Equation 47}$$

denotes the sequence of $N$ chips that are used to spread the n-th symbol of the i th user, where $N$ is the spreading factor. Note that in cellular terminology, $PN_i(k)$ is the combined PN sequence and Walsh/Hadamard code for the i-th user.

$$P(n \cdot N) = \lfloor \overline{p}_1(n \cdot N) \vdots \overline{p}_2(n \cdot N) \vdots \cdots \vdots \overline{p}_k(n \cdot N) \rfloor \quad \text{Equation 48}$$

is the $N \times K$ signature matrix holding the spreading codes of the n-th symbol of all $K$ users.

The matrix $I(d)$ is an $N \times N$ diagonal matrix whose first $d$ elements on the main diagonal are unity and all other elements are zero (thus, $I(N)$ is simply the identity matrix). $P(n \cdot N - d)$ is the matrix whose i-th column is $$\overline{p}_i(n \cdot N - d) = \begin{bmatrix} PN_i(n \cdot N - d) \\ PN_i(n \cdot N - d + 1) \\ PN_i(n \cdot N - d + 2) \\ \vdots \\ PN_i(n \cdot N - d + N - 1) \end{bmatrix} \quad \text{Equation 49}$$

For the multi-symbol model of FIG. 2, the cross-talk matrix M is given by:

$$M(n\text{Mod}L) \equiv \qquad\qquad\qquad\qquad\qquad \text{Equation 50}$$

$$\begin{bmatrix} I & \vdots & \overline{0} & \vdots & \overline{0} & \vdots & Rp_{1,0}(n+1) & \vdots & Rn_{1,0}(n+1) & \vdots & \overline{0} \\ \overline{0} & \vdots & I & \vdots & \overline{0} & \vdots & \overline{0} & \vdots & Rp_{1,0}(n) & \vdots & Rn_{1,0}(n) \\ \overline{0} & \vdots & \overline{0} & \vdots & I & \vdots & \overline{0} & \vdots & \overline{0} & \vdots & Rp_{1,0}(n-1) \\ Rp_{0,1}(n+1) & \vdots & \overline{0} & \vdots & \overline{0} & \vdots & I & \vdots & \overline{0} & \vdots & \overline{0} \\ Rn_{0,1}(n) & \vdots & Rp_{0,1}(n) & \vdots & & \vdots & \overline{0} & \vdots & I & \vdots & \overline{0} \\ \overline{0} & \vdots & Rn_{0,1}(n-1) & \vdots & Rp_{0,1}(n-1) & \vdots & \overline{0} & \vdots & \overline{0} & \vdots & I \end{bmatrix}_{6K \times 6K}$$

where, for notational brevity "(n Mod L)" is omitted and replaced by "n" from the matrix components, and $\bar{0}$ denotes a K×K matrix of zeros. The cross-correlation matrices are now given by:

$$Rp_{k,i}(n) \equiv \sum_{j=-J}^{J} Rp(\Delta_{k,i} + j, n) \cdot \rho(j \cdot OS - \Omega_{k,i}) \quad \text{Equation 51}$$

$$Rn_{k,i}(n) \equiv \quad \text{Equation 52}$$

$$\sum_{j=-J; Sign\{\Delta_{k,i}+j\}=Sign\{\Delta_{k,i}\}}^{J} Rn(\Delta_{k,i} + j, n) \cdot \rho(j \cdot OS - \Omega_{k,i})$$

The remaining elements are defined hereinabove.

What is claimed is:

1. A multi-user detector of transmitted signals, the detector comprising:
   a bank of despreaders to despread said transmitted signals to produce despreaded signals; and
   a processor to receive said despreaded signals and to separately process any cyclic and channel variations of said despreaded signals.

2. A multi-user detector according to claim 1 wherein said processor comprises:
   a tap weight generator to generate at least one tap weight at least from a cyclic code;
   a cyclic variation processor coupled to said tap weight generator to generally process said cyclic variations of said despreaded signals; and
   a channel variation processor coupled to said cyclic variation processor to process at least said channel variations of said despreaded signals.

3. A multi-user detector according to claim 2 wherein said tap weight generator is able to implement a minimum mean square error performance criterion and is able to utilize statistics of a channel which produces said channel variations.

4. A multi-user detector according to claim 2 wherein said tap weight generator is able to provide a decorrelation solution that separates users.

5. A multi-user detector according to claim 2 wherein said tap weight generator is adaptive.

6. A multi-user detector according to claim 2 wherein said tap weight generator is able to initially generate generally fixed cyclic vectors and then modify said cyclic vectors with non-cyclic weights.

7. A multi-user detector according to claim 2 wherein said channel variation processor utilizes average channel effects.

8. A multi-user detector according to claim 2 wherein said channel variation processor utilizes measured channel effects.

9. A multi-user detector according to claim 2 wherein said channel variation processor is connected on output to another multi-user detector.

10. A multi-user detector according to claim 9 wherein said processors operate on signals from K1 users and said another multi-user detector operates on the K2+1 of the signals produced by said processors, wherein K2<K1.

11. A multi-user detector according to claim 2 wherein said cyclic variation processor comprises a multiplicity of finger processors, one per finger of each said despreaded signal, and wherein each said finger processor comprises:
   tap weight vector multipliers, one per finger, to vector multiply a vector of said tap weights, one per finger and per finger processor, with each said finger; and
   a summer to sum the output of said tap weight vector multipliers.

12. A multi-user detector according to claim 11 wherein said channel variation processor comprises:
   a multiplicity of channel multipliers, one per finger processor, each of which multiplies one finger with its associated channel estimate; and
   a summer for summing the output of said channel multipliers.

13. A multi-user detector according to claim 2 wherein said tap weights are cyclic.

14. A multi-user detector according to claim 1 wherein said despreaded signals are direct sequence, code division multiple access (DS-CDMA) signals and said cyclic variations are at least partially due to a spreading code which spans more than one symbol.

15. A multi-user detector according to claim 14 wherein said processor processes one symbol at a time.

16. A multi-user detector according to claim 14 wherein said processor processes more than one symbol at a time.

17. A multi-user detector according to claim 1 wherein said processor demodulates one received signal.

18. A multi-user detector according to claim 1 wherein said processor demodulates more than one received signal.

19. A multi-user detector according to claim 1 wherein said cyclic variations are at least partially due to a spreading code having a base station portion and a user portion and wherein received signals are from multiple users having the same base station portion.

20. A multi-user detector according to claim 1 wherein said cyclic variations are at least partially due to a spreading code having a base station portion and a user portion and wherein received signals are from multiple users of which at least one user has a different base station portion than the rest of the users.

21. In a mobile unit for a cellular communication system, a multi-user detector of transmitted signals, the detector comprising:
   a bank of despreaders to despread said transmitted signals to produce despreaded signals; and
   a processor to receive said despreaded signals and to separately processes any cyclic and channel variations of said despreaded signals to demodulate one of said transmitted signals.

22. A multi-user detector according to claim 21 wherein said processor comprises:
   a tap weight generator to generate at least one tap weight at least from a cyclic code;
   a cyclic variation processor to communicate with said tap weight generator and to generally process said cyclic variations of said despreaded signals; and
   a channel variation processor to communicate with said cyclic variation processor and to process at least said channel variations of said despreaded signals.

23. In a base station for a cellular communication system, a multi-user detector of transmitted signals, the detector comprising:
   a bank of despreaders to despread said transmitted signals to produce despreaded signals; and
   a processor to receive said despreaded signals and to separately process any cyclic and channel variations of said despreaded signals to demodulate more than one of said transmitted signals.

24. A multi-user detector according to claim 23 wherein said processor comprises:
   a tap weight generator to generate at least one tap weight at least from a cyclic code;

a cyclic variation processor to communicate with said tap weight generator and to generally process said cyclic variation of said despreaded signals; and a channel variation processor to communicate with said cyclic variation processor and to process at least said channel variation of said despreaded signals.

25. In a cellular communication system having multiple antennas, a multi-user detector of signals received by said antennas, the detector comprising:

a bank of despreaders to despread said received signals to produce despreaded signals; and a processor to receive said despreaded signals and to separately process any cyclic and channel variations of said despreaded signals.

26. A system according to claim 25 wherein said cyclic variations are at least partially due to a spreading code having a base station portion and a user portion and wherein said signals are combined to reduce interference from base stations whose spreading codes are different than those found in said cyclic variations.

* * * * *